US009830339B2

(12) United States Patent
Noels et al.

(10) Patent No.: US 9,830,339 B2
(45) Date of Patent: Nov. 28, 2017

(54) DATA PROCESSING SYSTEM FOR PROCESSING INTERACTIONS

(71) Applicant: NGDATA Products NV, Ghent (BE)

(72) Inventors: Steven Noels, Oostakker (BE); Luc Burgelman, Lochristi (BE); Frank Hamerlinck, Heusden (BE)

(73) Assignee: NGDATA PRODUCTS NV, Ghent (BE)

( * ) Notice: Subject to any disclaimer, the term of this patent is extended or adjusted under 35 U.S.C. 154(b) by 198 days.

(21) Appl. No.: 14/703,600

(22) Filed: May 4, 2015

(65) Prior Publication Data

US 2016/0328422 A1    Nov. 10, 2016

(51) Int. Cl.
*G06F 17/00* (2006.01)
*G06F 17/30* (2006.01)
*G06Q 10/10* (2012.01)

(52) U.S. Cl.
CPC ....... *G06F 17/30289* (2013.01); *G06Q 10/10* (2013.01)

(58) Field of Classification Search
CPC ......... G06F 17/30289; G06F 17/30371; G06F 17/30; G06F 17/30589
USPC .................................................. 707/600–899
See application file for complete search history.

(56) References Cited

U.S. PATENT DOCUMENTS

| 6,567,803 | B1 | 5/2003 | Ramasamy et al. |
| 6,567,804 | B1 | 5/2003 | Ramasamy et al. |
| 2003/0144868 | A1 | 7/2003 | MacIntyre et al. |
| 2011/0213663 | A1* | 9/2011 | Hoffman ................ G06Q 30/02 705/14.58 |
| 2013/0013552 | A1 | 1/2013 | Eshleman et al. |

OTHER PUBLICATIONS

Belgian Search Report from BE Application No. 201605319, dated Jan. 9, 2017.
Han et al., "Data Preprocessing", Data Mining: Concepts and Techniques 2nd Edition Chapter 2, Mar. 1, 2006, pp. 47-103. Morgan Kaufmann Publishers.

* cited by examiner

*Primary Examiner* — Isaac M Woo
(74) *Attorney, Agent, or Firm* — Workman Nydegger

(57) ABSTRACT

A data processing system for processing data related to incoming interactions. The data processing system comprises a first configuration object defining a set of metrics; a second configuration object defining a number of aggregation primitives, by analyzing requirements of the set of metrics; a first processing unit adapted for receiving data related to incoming interactions, and adapted for real time calculation of at least one aggregation primitive based on this data taking into account the second configuration object; a data storage element for storing the calculated at least one aggregation primitive without storing raw data related to the incoming interactions; a second processing unit adapted for calculating one or more metrics based on the stored at least one aggregation primitive taking into account the first and the second configuration object.

9 Claims, 3 Drawing Sheets

DATA PROCESSING SYSTEM FOR PROCESSING INTERACTIONS

FIELD OF THE INVENTION

The present invention relates to the field of data processing systems. More specifically it relates to the field of big data analytics.

BACKGROUND OF THE INVENTION

When vast amounts of data are present and are continuously entering in a data store (which might even be distributed), accurate and quick analysis of the data in the data store is of crucial importance for users who want to act upon information contained therein.

It is thereby important that the response time on a user request is within a reasonable (e.g. a few seconds) time limit. The response must moreover be based on an accurate representation of the data which is present in the data store. The data store may contain a large variety of data, it may be distributed and the stored data may be unstructured. User requests may therefore require a thorough analysis of the data store which has a direct impact on the response time.

Data processing systems are therefore facing the problem of, on one hand, real-time response time requirements, and, on the other hand, thorough analysis requirements on distributed data stores containing a vast amount of data which is continuously increasing.

US2013/0013552 A1 discloses an interest-driven Business Intelligence system. In this data processing system raw data is stored in a raw data storage, metadata is stored in a metadata storage, and the system comprises an interest-driven data pipeline that is automatically compiled to generate reporting data using the raw data. The interest-driven data pipeline is compiled based upon reporting data requirements automatically derived from at least one report specification defined using the metadata. US2013/0013552 A1 thereby wants to have an improved response time, and thus improved interactivity, compared to existing systems used to store large volumes of data. Instead of using data pipelines which need to be changed by engineers each time the data requirements are changing, an interest-driven data pipeline is automatically compiled when the reporting data requirements are changed.

There is, however, still room for more efficient data processing systems for big data analytics (for example with regard to response time, accurateness, and/or flexibility).

SUMMARY OF THE INVENTION

It is an object of embodiments of the present invention to provide an efficient data processing system.

The above objective is accomplished by a method and device according to the present invention.

In a first aspect embodiments of the present invention relate to a data processing system for processing data related to incoming interactions. The data processing system comprises: a first configuration object defining a set of metrics; a second configuration object defining a number of aggregation primitives, by analyzing requirements of the set of metrics; a first processing unit adapted for receiving data related to incoming interactions, and adapted for real time calculation of at least one aggregation primitive based on this data taking into account the second configuration object; a data storage element for storing the calculated at least one aggregation primitive without storing raw data related to the incoming interactions; a second processing unit adapted for calculating one or more metrics based on the stored at least one aggregation primitive taking into account the first configuration object and the second configuration object.

It is an advantage of embodiments of the present invention that aggregation primitives are defined based on the first configuration object which defines a set of metrics. One metric can thereby be obtained by combining different aggregation primitives. One aggregation primitive can be used for obtaining different metrics. It is an advantage of embodiments of the present invention that an intermediate step (i.e. the aggregation primitives which are stored) is used to obtain the metrics. As the stored aggregation primitives can be reused for obtaining different metrics it allows to prevent that similar calculations based on the interactions need to be redone twice. It is an advantage of embodiments of the present invention that aggregation primitives are calculated and stored in real-time. Upon a request for a metric (i.e. when consulting the data) it is therefore not required to process all the interaction related data. The requested metric(s) can be calculated based on the already calculated aggregation primitives. As the calculation and storage of the aggregation primitives is done in real-time they are ready upon request for calculating a particular metric. The calculation of the metrics is based on simple operators such as for example sum, count, or MAX, MIN operations. This permits fast real-time calculation of the metrics using the aggregation primitives. It is an advantage of embodiments of the present invention that the metrics are not calculated in real-time upon arrival of the interactions. This offloads the data processing system leaving more processing power for calculating and storing the aggregation primitives. The effective metrics are only calculated upon request. It is an advantage of embodiments of the present invention that the aggregation primitives are stored in the data storage element. This allows to request metrics based on aggregation primitives from the past without having to recalculate them. It is an advantage that only the aggregation primitives need to be stored and not all data extractable from the interactions. This allows to reduce the space required in the data storage element. It is an advantage of embodiments of the present invention that the data processing system does not need to store the raw data for calculating the metrics. This allows to reduce the space required in the data storage element of the data processing system. It is an advantage of embodiments of the present invention that the aggregation primitives are stored since based on these aggregation primitives several metrics can be calculated. Moreover new metrics may be defined and calculated based on the already existing set of aggregation primitives. Where in embodiments of the present invention the first processing and the second processing unit are adapted for executing a task such as receiving date related to an incoming interaction this may be implemented by compiling a piece of code and afterwards running It on the first or second processing unit. It is an advantage of embodiments of the present invention that it is not required to do a recompilation of the code if a new metric is requested (i.e. a new query). It is an advantage of embodiments of the present invention that the first configuration object allows to define a new set of metrics and that the aggregation primitives can be obtained therefrom without requiring a recompilation of the code.

The first processing unit may be adapted for requesting data from an external storage medium. Thereby the first processing unit may be adapted for calculating at least one aggregation primitive based on the data requested from the external storage medium.

It is an advantage of embodiments of the present invention that calculation of the aggregation primitives can be done based on data related to incoming interactions (real-time) as well as based on data stored in an external storage medium. It is an advantage of embodiments of the present invention that these calculations are done in parallel.

The first configuration object and the second configuration object may be one and the same object.

It is an advantage of embodiments of the present invention that the metrics and the aggregation primitives are defined in one and the same object. This makes it easier for a user to add a relationship or update any of these relationships. It is an advantage that only one object needs to be changed in case a new metric is defined.

The first processing unit and the second processing unit may be one and the same processing unit.

The first processing unit may be adapted for subdividing interactions into interaction types.

It is an advantage of embodiments of the present invention that the first processing unit is adapted to distinguish these different interaction types as this allows to calculate different aggregation primitives per interaction type.

The first processing unit may be adapted for grouping aggregation primitives based on the extracted data.

In embodiments of the present invention the data extracted from the interactions can be subdivided into data from which the aggregation primitives can be calculated and into data representing entities. It is an advantage of embodiments of the present invention that these entities can be used to group the aggregation primitives.

The first processing unit and/or the second processing unit may be adapted for monitoring at least one metric.

It is an advantage of embodiments of the present invention that aspects of the interactions can be monitored in real-time. It is an advantage of embodiments of the present invention that monitoring of the metrics can be used for generating alerts. It is thereby an advantage that the metrics can be calculated upon request and that it is not required to store them. In embodiments of the present invention a threshold is specified for a metric, such that when the metric increases above or decreases below this threshold, an alert is raised. This could for example indicate that the number of clicks on a website increase above a pre-determined level. The threshold corresponding with a metric can be stored in the data storage element. It is an advantage that the metrics can be regularly updated upon request as this also allows ad hoc monitoring of particular aspects of the dynamic behavior of the metrics.

The first processing unit and/or the second processing unit may be configured to generate an alert based on the monitored at least one metric.

It is an advantage of embodiments of the present invention that changes in the metrics can be alerted at real-time. The configuration of the first processing unit and/or the second processing unit to generate the alert is also referred to as the alert system.

In a second aspect, embodiments of the present invention relate to a method for processing data related to incoming interactions. The method comprises: in a first step, defining a set of metrics in a first configuration object; in a second step, defining a number of aggregation primitives in a second configuration object by analyzing requirements of the set of metrics; in a third step, running a process wherein the data related to incoming interactions is received and wherein at least one aggregation primitive is calculated in real time based on this data taking into account the second configuration object, and wherein the at least one aggregation primitive is stored in a data storage element without storing raw data related to the incoming interactions; and in a fourth step, running a process wherein requests for the at least one metric are received and wherein the at least one metric is calculated based on the stored at least one aggregation primitive taking into account the first configuration object and the second configuration object.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
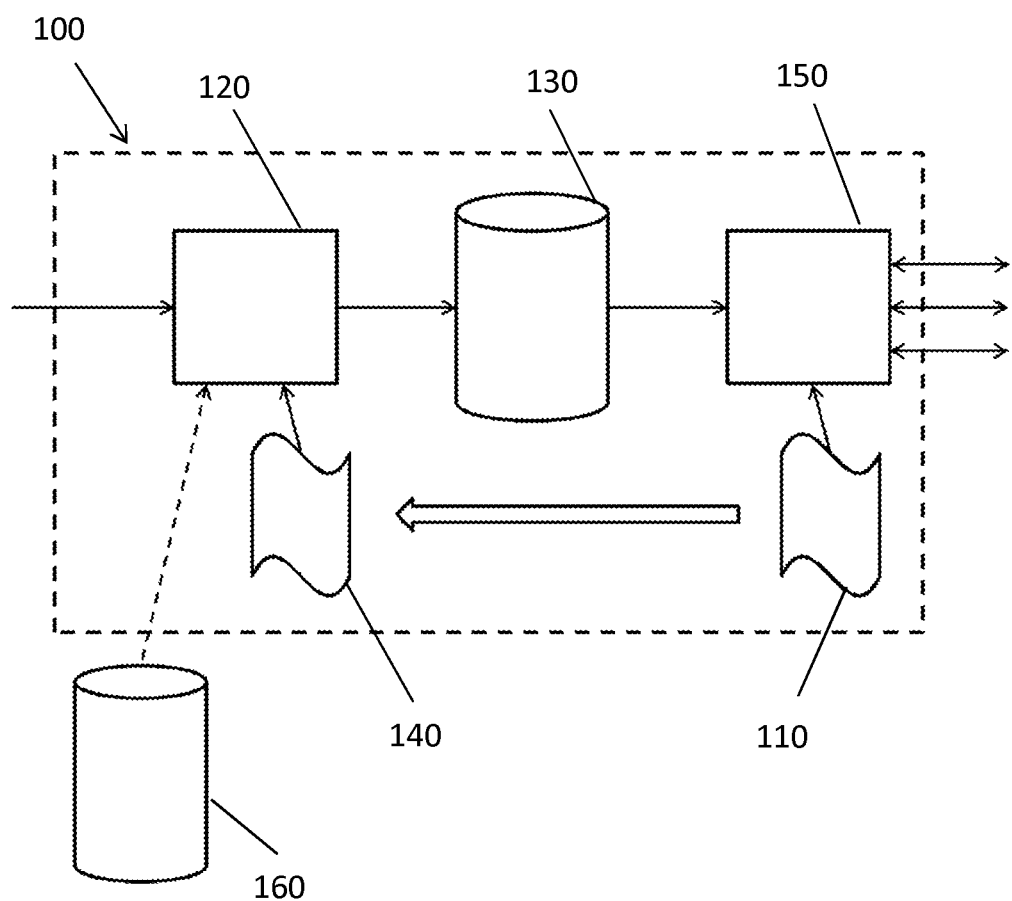
FIG. 1 shows a block diagram of a data processing system according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

DEFINITIONS

In the context of the present invention, the following terminology has the following meaning:

Where in embodiments of the present invention reference is made to "raw data", reference is made to the data related to incoming interactions.

Where in embodiments of the present invention reference is made to "metrics" reference is made to user defined parameters. The user thereby defines the metrics in function of the raw data. A metric can be referenced to by an identification which is the "metric id".

Where in embodiments of the present invention reference is made to "aggregation primitives" reference is made to values which are calculated and stored upon arrival of incoming interactions. The metrics can be calculated by using the calculated and stored aggregation primitives.

Where in embodiments of the present invention reference is made to "an alert notification queue", reference is made to a queue wherein changes to a Boolean predicate are queued. The Boolean predicate is thereby evaluated with regard to one or more metrics.

Where in embodiments of the present invention reference is made to "a metric change queue", reference is made to a queue in which metrics, which are potentially affected by an aggregation primitive change, are listed.

Where in embodiments of the present invention reference is made to "a write interceptor", reference is made to a function for intercepting update operations of the in the data storage 130 managed aggregation primitives per entity. The entities are thereby extracted data coming from the incoming interactions and are used to group the aggregation primitives.

Where in embodiments of the present invention reference is made to "an interaction ingest endpoint", reference is made to a part of the first processing unit 120 were data is received. The interaction ingest endpoint may be implemented in an application programming interface (API).

In a first aspect the present invention relates to a data processing system 100 for processing data related to incoming interactions (for example a clickstream). An incoming interaction may comprise several attributes such as for example, but not limited thereto, a value associated with the interaction, the name and the data type of this value, the moment in time the interaction occurred. An exemplary schematic block diagram of such a processing system 100 is shown in FIG. 1.

The processing system 100 comprises a first processing unit, configured for receiving data related to incoming interactions, for calculating therefrom at least one aggregation primitive and for outputting this at least one aggregation primitive. The processing system 100 comprises a data storage element 130 for storing the at least one aggregation primitive. This storage of aggregation primitives is grouped per entity, for instance per customer. The processing system 100 also comprises a second processing system configured for receiving at least one aggregation primitive, and for calculating therefrom at least one metric defined so as to enable extraction of for the user relevant data from the data related to the incoming interactions.

In embodiments of the present invention the data processing system 100 comprises a first configuration object 110 defining a set of metrics. These metrics may be defined in function of the data related to the incoming interactions.

In embodiments of the present invention the interactions may be subdivided in interaction types. This allows the first processing unit 120 to calculate aggregation primitives per interaction type and to store the aggregation primitives in the data storage element 130 per customer and per interaction type.

In embodiments of the present invention the data related to incoming interactions may be structured before it is used for calculating the aggregation primitives.

The data processing system moreover comprises a second configuration object 140 defining a number of aggregation primitives. In the second configuration object the aggregation primitives and how they should be calculated based on the data related to incoming interactions are defined. This may be done by the first processing unit 120. The aggregation primitives are defined by analyzing requirements of the set of metrics as defined in the first configuration object 110. The first configuration object 110 is analyzed and therefrom it is concluded which aggregation primitives will be or need to be stored. Using the aggregation primitives, later on, the metrics can be calculated. The first configuration object 110, defining the metrics, may be defined at startup and may be changed afterwards, for instance when another type of information is required. After changing the first configuration object 110, the second configuration object 140 is redefined based on the first configuration object 110, so that the aggregation primitives required for calculating the newly defined set of metrics are available.

The first and second configuration object may for example be in the form of a file or an internal software structure.

In embodiments of the present invention, the data related to the incoming interactions, also referred to as the raw data, is extracted from the interactions by a first processing unit 120. The first processing unit 120 moreover calculates at least one aggregation primitive based on the extracted data by taking into account information from the second configuration object 140. This is done in real-time, upon arrival of incoming interactions.

In embodiments of the present invention the calculated aggregation primitives are stored in the data storage element 130. They may be stored at any point in time. This allows to retrieve actual aggregation primitives as well as aggregation primitives from the past. The raw data, however, is not stored in the data storage element 130. This is not required in accordance with embodiments of the present invention because the at least one metric can be obtained from the aggregation primitives which are calculated in real time and which are stored in the data storage element 130.

The stored aggregation primitives serve as a basis for calculating the metrics. In embodiments of the present invention this may be done by the second processing unit 150 which is adapted for calculating metrics based on the stored at least one aggregation primitive taking into account the first configuration object 110 and the second configuration object 140. A particular aggregation primitive may be reused for calculating different metrics.

In embodiments of the present invention the aggregation primitives may be stored per dimension. A primary dimension may be the time dimension. In that case the aggregation primitives are stored per pre-defined time unit, such as for instance per day. This makes it possible to calculate metrics considering different time windows. The metrics may for example be calculated on a weekly basis, or on a monthly basis, or on a yearly basis, all using the same aggregation primitives. Of course the pre-defined time unit should be selected such that metrics can be determined for the smallest time window one could be interested at. For instance, if aggregation primitives are stored and aggregated per day, it will not be possible to extract information on a per-hour basis, while inversely, if aggregation primitives are stored and aggregated per hour, it will be possible to extract information both on a per-hour basis and on a per-day basis.

Figure 5:
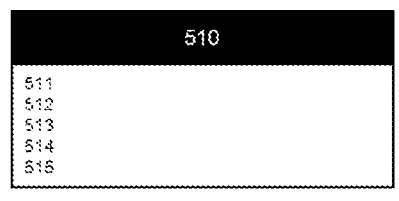
FIG. 5 shows an example of a relationship between an interaction and metrics according to an embodiment of the present invention.
Figure 5:

In embodiments of the present invention additional dimensions may be used for storing the aggregation primitives, such as for example merchant category. The aggregation primitives may for example be structured using break metrics (e.g. per city and per merchant category). An example thereof is shown in FIG. 5. In the example, the incoming interaction 510 comprises:
- an interaction type 511 (e.g. purchase),
- a timestamp 512 (e.g. 2010-05-07T13:01:51+01:00) which corresponds with a temporal dimension,
- a merchant category 513 (e.g. gifts) which corresponds with a categorical dimension,
- a city 514 (e.g. Gent) which corresponds with an additional categorical dimension,
- an amount 515 (e.g. 230 euro).

These incoming interactions may lead to the following resulting metrics 520:
- a PurchaseAmountPerDay metric 521 and an AveragePurchaseAmountPerWeek metric 522; these metrics have a temporal dimension,
- a TotalNumberOfPurchasesPerCity metric 523, which is a break metric using city 514 as categorical dimension,
- a AveragePurchaseAmountPerMerchantCategoryPerMonth metric 524, which is a break metric using merchant category 513 as categorical dimension and having a temporal dimension.

In embodiments of the present invention, the metrics may be calculated upon request. In the same or alternative embodiments, some metrics may also be calculated substantially immediately upon arrival of a new interaction.

Operators for calculating the metrics from the aggregation primitives are operations which allow fast calculation from the storage of the aggregation primitives. These operations are preferably distributive operations (i.e. both associative and commutative) such as sum, min, max, first, last, countDistinct and lag.

The operator "countDistinct" thereby counts the number of distinct values seen among all interactions in the aggregation window. This is based on the probabilistic HyperLogLog, so that is able to handle large cardinalities. The count is not exact, but has a high probability of being close to the real value.

The "lag" operator enables to obtain the n-th previous value from a reference point. The reference point is configurable so the user can retrieve the n-th previous value since a particular date or a metric holding a date value.

The associative and commutative properties allow to calculate and store the aggregation primitives at run time (with any incoming interaction) and then calculate the possibly complex metrics at query time based on the aggregation primitives. The already calculated aggregation primitives result in a reduction of the calculation time of the metrics. The second configuration object 140 may comprise the name and the data type of the value(s) to be used for calculating the aggregation primitive as well as the distributive operator(s). A subset of the aggregation primitives may be used for calculating the metrics. An average (mean) is an exemplary operation that cannot be directly implemented as a distributive operation, although it can be decomposed in two distributive operations (sum and count). The sum and count can be real-time calculated and stored as aggregation primitives. The average is a metric that can be calculated from the sum and the count upon request.

The metrics are defined in the first configuration object 110 and they can be calculated using the aggregation primitives which are defined in the second configuration object 140. The second processing unit 150 is configured for calculating the metrics based on the at least one aggregation primitive taking into account the first configuration object 110 and the second configuration object 140. The calculation of a metric may be triggered by a request for that metric.

The first configuration object 110 and the second configuration object 140 may be different configuration objects, or they may be implemented in one and the same configuration object.

The first processing unit 120 and the second processing unit 150 may be physically discernable processing units, each adapted for, respectively, receiving data related to incoming interactions, and adapted for real time calculation of at least one aggregation primitive based on this data taking into account the second configuration object 140, and adapted for receiving at least one aggregation primitive and calculating metrics based on that least one aggregation primitive taking into account the first configuration object 110 and the second configuration object (140). Alternatively, they may be implemented as one and the same processing unit adapted for receiving data related to incoming interactions, and adapted for real time calculation of at least one aggregation primitive based on this data taking into account the second configuration object 140, and adapted for calculating metrics based on the stored at least one aggregation primitive taking into account the first configuration object 110 and the second configuration object (140).

In embodiments of the present invention the functionality of the first processing unit 120 may be distributed over different processing units. This may also be the case for the second processing unit 150.

The first processing unit 120 may also be adapted for requesting data from an external storage 160, rather than, or besides, obtaining raw interaction data on the fly. The data stored in the external storage 160 may be structured in the same way as the data coming from the incoming interactions. If the data coming from the external storage 160 is structured in the same way as the data coming from the interactions, it is an advantage that calculating the at least one aggregation primitive based on data coming from an interaction and calculating the at least one aggregation primitive based on data coming from an external storage 160 can be done the same way.

In embodiments of the present invention data related to incoming interactions may be augmented with data coming from other systems. This data may also be used when calculating the aggregation primitives. The data related to incoming interactions may be stored in a specific structure.

In embodiments of the present invention the aggregation primitives are grouped per entity. An example of an entity, the present invention not being limited thereto, is a customer. A set of aggregation primitives is thereby assigned for each customer. For each interaction it is known which customer is concerned. Each row in the database may correspond with a different customer. In each row, a plurality of aggregation primitives may be stored.

In embodiments of the present invention metrics may be calculated based on the real-time calculated aggregation primitives. It is therefore not required to retrieve the interaction data for obtaining a metric. It is an advantage of embodiments of the present invention that the response time on a request for a metric is decreased by storing, in accordance with embodiments of the present invention, the aggregation primitives.

Typically, processing systems 100 according to embodiments of the present invention must be able to cope with large amounts of data, for example more than 10 TB or even more than 1000 TB. The number of interactions per second that such processing systems 100 must be able to handle are above 1000 or even above 10000. The response time on a request for a metric is preferably below 20 ms or even below 5 ms or even below 0.1 ms.

Data processing systems according to embodiments of the present invention may be organized in a distributed setup running on a number of nodes. This allows the system to scale in function of the processing capacity by increasing the number of nodes.

Figure 4:
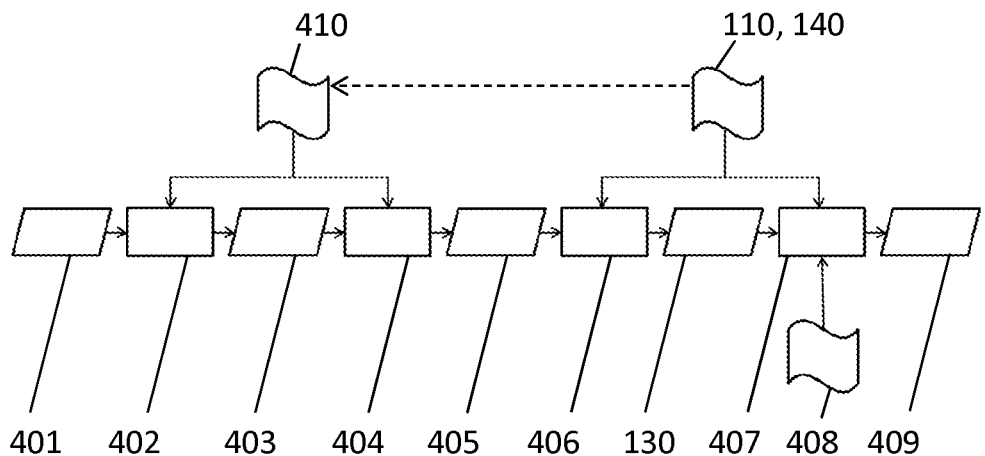
FIG. 4 shows a data flow in accordance with an embodiment of the present invention.

FIG. 4 shows a possible data flow in a data processing system in accordance with an embodiment of the present invention. Block 401 represents the incoming raw data. The raw data may be mapped by a mapping process 402. To this end, the mapping process makes use of interaction type configuration info stored in a configuration object 410. Thereby the raw data related to incoming interactions is converted into structured data according to a scheme stored in the configuration object 410. The mapped data 403 is used as input for an augmentation process 404. The augmentation process may complement the mapped data 403 with data coming from other systems, thus resulting in the augmented data 405. A process 406 running in the first processing unit 120 processes the augmented data 405 and calculates aggregation primitives taking into account the second configuration object 140, and hands over these aggregation primitives for storage in data storage element 130. The stored aggregation primitives are used as input for a query process 407 running on the second processing unit 150. The query process can be configured using query parameters 408, which may for instance be user defined. The query process takes into account the first configuration object 110 and the second configuration object 140 for obtaining the metrics 409. The first configuration object 110 defines a set of metrics in function of the incoming interactions. This is represented by the dotted line between the first configuration object 110 and the interaction type configuration in the configuration object 410. In embodiments of the present invention the first processing unit 120 and/or the second processing unit 150 are adapted for monitoring at least one aggregation primitive and/or at least one metric. The metrics may be used to analyze the dynamic behavior related to the incoming interactions. It is for example possible to check if a maximum or minimum threshold has been crossed or to verify a trend in the variation of a metric. In embodiments of the present invention alerts may be generated based upon a particular dynamic behavior of a metric. This may be done by an alert system that monitors the metrics and checks if an alert should be generated. Such an alert may for example be a notification that the purchase amount of this customer goes over 9000 US$. It is an advantage of embodiments of the present invention that an alert can be generated based on the metrics which can be calculated using the real-time calculated aggregation primitives. The alert may be generated in a predefined time span. This time span may for example be limited to less than 5 seconds, more preferably less than 2 seconds, more preferably less than a second after an alert condition is activated. The alerts may be defined per metric, per entity (e.g. customer) or per set of entities.

In embodiments of the present invention the data processing system 100 may automatically produce the alerts at run time. This is done by an alert system which analyses the dynamic behavior of at least one of the metrics. The alerts may be generated based on the values of the metrics. Since these values can be calculated in real-time, the alert can be generated as soon as the alert condition is activated. Generation of the alerts only requires verifying particular conditions of the metrics. The load on the data processing system 100 is therefore not significantly increased by the alert system. The alert system is preferably loosely coupled with the type of data storage element 130 and any other technology choices made for the data processing system 100. The alert system may for example have access to a query service for accessing the data storage element 130.

In embodiments of the present invention an alert may be defined as a Boolean predicate that is applied to a combination of metrics. An alert notification is created when a metric changes such that the result of the predicate crosses the threshold from false to true or from true to false. This alert notification may be sent to one or more alert notification consumers.

In an exemplary embodiment of the present invention the data processing system 100 is implemented to keep track of credit-card purchases for different customers. Interaction types in this case are purchases and web clicks.

In this example the following data can be extracted from the purchase interaction: the purchase amount, the merchant category and the city where the transaction took place. The entities which are used for grouping the aggregation primitives are the merchant category and the city. The aggregation primitives are in this case the sum of the purchase amounts in one day, the number of interactions in one day and the maximum interaction amount in one day. The purchase amounts for a week can then be calculated by summing each day's values for the specified week. The purchase amounts for a week is a metric which can be obtained using the "the purchase amount for a day" aggregation primitive.

The web clicks are another interaction type. An aggregation primitive which can be calculated for this interaction type is for example the number of web clicks in one day.

The interaction types together with the extractable data are summarized in the table below.

| Interaction type | Data: Entity | Data: Entity | Data: |
|---|---|---|---|
| Purchase Web clicks | Merchant category | City | Purchase amount |

The corresponding aggregation primitives are:
the sum of the purchase amounts in one day (AMOUNT),
the number of interactions in one day (NUMBER),
the maximum interaction amount in one day (MAX),
the number of web clicks.

The first three can be grouped by the merchant category entity and by the city entity. In this exemplary embodiment of the present invention the aggregation primitives are calculated and stored per day. Other time granularities might also be possible.

After a first interaction, the following aggregation primitives are stored in the data storage element 130 by the data processing system 100.

Interaction 1 (date=2015-01-01):

| Interaction type | Data: Entity | Data: Entity | Data: |
|---|---|---|---|
| Purchase | Merchant category Food | City Gent | Purchase amount 10 |

Aggregation primitives in the data storage element 130 grouped per merchant category and per city after interaction 1:

| Merchant category | City | AMOUNT | NUMBER | MAX |
|---|---|---|---|---|
| Food | Gent | 10 | 1 | 10 |

Interaction 2 (date=2015-01-01):

| Interaction type | Data: Entity | Data: Entity | Data: |
|---|---|---|---|
| Purchase | Merchant category Sports | City Gent | Purchase amount 5 |

Aggregation primitives in the data storage element 130 grouped per merchant category and per city after interaction 2:

| Merchant category | City | AMOUNT | NUMBER | MAX |
|---|---|---|---|---|
| Food | Gent | 10 | 1 | 10 |
| Sports | Gent | 5 | 1 | 5 |

Interaction 3 (date=2015-01-01):

| Interaction type | Data: Entity | Data: Entity | Data: |
|---|---|---|---|
| Purchase | Merchant category Food | City Brussel | Purchase amount 20 |

Aggregation primitives in the data storage element 130 grouped per merchant category and per city after interaction 3:

| Merchant category | City | AMOUNT | NUMBER | MAX |
|---|---|---|---|---|
| Food | Gent | 10 | 1 | 10 |
| Sports | Gent | 5 | 1 | 5 |
| Food | Brussel | 20 | 1 | 20 |

Interaction 4 (date=2015-01-01):

| Interaction type | Data: Entity | Data: Entity | Data: |
|---|---|---|---|
| Purchase | Merchant category Food | City Gent | Purchase amount 12 |

Aggregation primitives in the data storage element 130 grouped per merchant category and per city after interaction 2:

| Merchant category | City | AMOUNT | NUMBER | MAX |
|---|---|---|---|---|
| Food | Gent | 22 | 2 | 12 |
| Sports | Gent | 5 | 1 | 5 |
| Food | Brussel | 20 | 1 | 20 |

These are the interactions which occurred on 2015-01-01. The aggregation primitives are calculated real-time by the first processing unit 120 upon arrival of the interaction. It is an advantage of embodiments of the present invention that the real-time calculated aggregation primitives can be used to analyze the dynamic behavior of the customer-level metrics related to the purchase interactions.

Metrics can be updated upon request based on the already calculated aggregation primitives. The metrics are defined in a first configuration object 110 and the aggregation primitives which can be used to calculate them are defined in a second configuration object 140. One metric could for example be: "What is the maximum interaction amount per city over the past week". This maximum can be obtained from the calculated aggregation primitives which are stored in the data storage element 130 by collecting the MAX aggregation primitives (Gent: 12, Gent: 5, Brussel: 20) and by collapsing them per city entity (Gent: 12, Brussel: 20).

Another metric could be: "What is the average purchase amount over the past week". The purchase interactions are processed at real-time by the data processing system 100 and stored in the NUMBER aggregation primitive. The purchase amount is stored in the AMOUNT aggregation primitive. The metric can be obtained by summing the NUMBER aggregation primitives and the AMOUNT aggregation primitives (sum NUMBER: 4, sum AMOUNT: 47). The average metric can then be obtained by dividing both (AMOUNT/NUMBER=47/4=11.75). This metric can be calculated upon request. It is thereby an advantage of embodiments of the present invention that the metric can be calculated based on the aggregation primitives and that it is not required to collect all information from the past interactions.

A typical alert may be generated when the sum of the amount of purchase over the past days is below a predetermined threshold, for example 100 (sumAmountPurchasesPast7Days<100). This alert could then be applied to the set of customers "Big Spenders", and configured to set off a notification in a dashboard when any members of the "BigSpenders" set's purchase amount over the past 7 days goes below 100 EUR.

An alert can thus be decomposed in the following predicates:
- A Boolean predicate that defines the true/false threshold for the alert itself
- A membership predicate, which defines to which metrics the alert should be applied. This can be an ad-hoc set of individual customers identified by id, a defined set of customers, or a set itself. Thereby a Set is a group of customers sharing the same metric values. It is possible to define specific metrics, e.g. the average of metrics over different customers within the set.

Alert notifications are defined as an alert action (e.g. sending a message to a notification queue, etc) for one or more alerts.

The Boolean predicate may be applied to a subset of metrics. A subset of metrics with values already above a pre-determined level may for example be selected. A subset of metrics can also be created based on an entity. This can be an ad-hoc set of individual customers identified by an id, a defined set of customers, or a set itself. An alert can therefore be defined as two predicates: the Boolean predicate and the membership predicate.

In embodiments of the present invention 4 types of alerts can be distinguished:
- Customer alerts (other entities might also be envisaged): An alert for a specific metric which is defined on the level of a single customer, used to evaluate the metrics for that customer only.
- Set alerts: an alert for a specific metric which is defined on the level of a Set, used to evaluate the metric of the Set (and not the customers belonging to that Set).
- Metric alerts: an alert for a specific metric which is valid for all customers.
- Set-Member alerts: an alert for a specific metric which is valid for all members of a Set. These kind of alerts should be re-evaluated, each time the set-membership is re-established (this is not the case for metric alerts)

In embodiments of the present invention the following requirements may apply separately or in combination:
- An alert is defined on a Boolean predicate which is calculated using at least one metric.
- An alert may have multiple metric validations which may be combined using AND, OR and NOT.
- The metric for which the alert is defined may be evaluated comparing it with a static value or comparing it with another metric.
- Alerts may be defined on different entity levels (companies and customers may in this case, as an example only, be entities).
- Multiple alerts may be defined on the same metric.
- The status of an alert may be reset in order to be able to fire alert events each time the alert conditions are met.

At the highest level, in embodiments of the present invention three main functionalities form the core of the alert system. These are:

Defining of alerts
Calculation/creation/sending of alert notifications
Consumption of alert notifications In embodiments of the present invention an alert is defined in persistent storage as two predicates: the Boolean predicate, and the membership predicate, as defined above.

Write interceptors e.g. in the form of coprocessors, may intercept all writes of aggregation primitives to an aggregate structure, and evaluate which metrics will be affected by that write. The metric id, timestamp of the write, and the list of potentially affected metrics from the write are added to a message queue (called the "metric change queue" 321). Note that the metric change queue has no knowledge of alerts—it is only providing messages that one or more metric values have likely changed. Where possible, a hint may also be provided about the change (e.g. it increased or decreased).

An additional process 313 that may be run at regular (e.g. daily) intervals may also send messages to the metric change queue for each metric with a list of metrics which may have changed due to the passing of time (and not by the processing of an interaction). In embodiments of the present invention an offline metric value expiration process 313 is responsible for expiring metric values that are based on a time window. For example, a sumAmountLast7Days stays at a constant value for the 7 days after a single purchase has been done, and then drops to 0 without any additional interaction processing. The offline metric value expiration process 313 makes a list of all potentially changed metrics based on the current time (as well as their dependent formula metrics), creates a list of these metric names, and creates messages for each metric. This process may be optimized by only sending metric change messages for metrics that have had interactions in the time leading up to the expiration (e.g. if a metric has been totally inactive for the past 6 months, there is no possibility that its sumAmountPast7Days will change).

Figure 3:
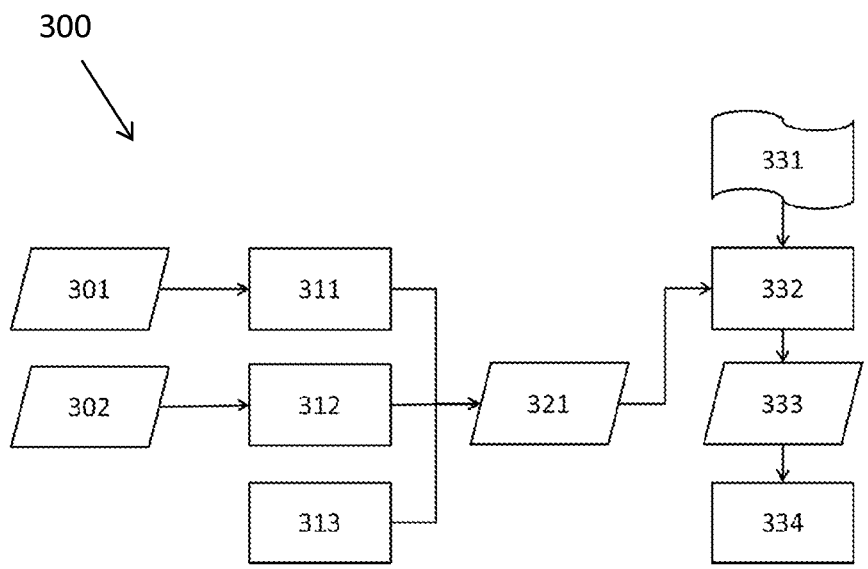
FIG. 3 is a flow chart illustrating message queues in an alert system according to an embodiment of the present invention.

FIG. 3 is a flow chart illustrating message queues in an alert system 300 according to an embodiment of the present invention. A consumer of the metric change queue 321 receives messages about metric changes. The metric change queue 321 may receive inputs from different processes. The inputs may come from a metric calculation engine endpoint 311, and/or from an entity field write interceptor 312 and/or from the metric value expiration process 313. The metric calculation engine endpoint 311 thereby processes the incoming interaction data 301 and the entity field write interceptor 312 processes the incoming entity data 302. If a metric change message is received for a metric that has one or more alerts configured for it, each applicable alert is checked if its condition can be changed by one of the metrics that was changed. If the alert state for the metric has potentially changed due to the changed metric values, the metric values are queried from just before and just after the timestamp in the metric change message. The boolean predicate may be calculated for the pre-change and post-change values, and if the result of the predicate is different over the two timestamps, a positive (from false to true) or a negative (from true to false) message is added to the alert notification queue 333. One or more alert notification queue consumers 334 consume notification messages of the alert notification queue 333. These consumers 334 may take some kind of action (store the alert notification in an external system; send a push notification to an external system, etc). Compacting of multiple notification messages and similar functionality may also take place here.

It is an advantage of embodiments of the present invention that the work done to generate metric change messages is minimal. The work load can be minimized by evaluating a metric only at a time resolution at which is changing and not at a smaller time resolution.

In embodiments of the present invention the alert manager 332 uses a QueryService to obtain the metrics. It is an advantage of embodiments of the present invention that this decouples the alert manager 322 from the rest of the data processing system. In embodiments of the present invention the metric change queue 321 can be used for other things than alerts. The metric change queue may for example be used for determining if a customer should be analyzed for changed set membership.

In embodiments of the present invention alerts are defined as records in an alerts table. An alert has a name, a Boolean predicate, and a membership predicate (a list of customer ids or a list of set ids). These definitions may be stored in a alert configuration object 331 which is used by the alert manager 332.

The write interceptor may be resident within the interaction ingest endpoint, whereby the interaction ingest endpoint is the component writing data from the first processing unit 120 to the data storage element 130. For each incoming interaction that is written, a collection may be made of the names of all aggregation primitives and their dependent formulas that are potentially affected by the change. This is essentially the inverse of the operation of deciding which aggregation primitive need to be read in order to calculate a metric. The interaction ingest endpoint may act as a producer for the metric change queue, and write the relevant message (containing metrics id, and change direction hints) to the metric change queue. Thereby it is an advantage that an update of a metric is only evaluated for specified metrics and customers for which alerts should be generated. It is thus an advantage that it is not required to evaluate every metric change for every customer.

In embodiments of the present invention the data processing system comprises an alert manager 332. The alert manager 332 is a consumer of the metric change queue 321, and is responsible for calculating the pre- and post-metric change values to see if a metric has crossed an alert threshold in either direction. The alert manager 332 is not necessarily a single process—it can be distributed, but the underlying message queue is responsible for ensuring that all messages for the same metric always go to the same alert manager 332 instance. In embodiments of the present invention the data processing system is able to query fine grained recent changes of metrics. The data processing system may for example, query the exact value of the sumAmountLast7Days exactly 5 seconds ago, as well as 4 seconds ago. The alert manager 332 may query the metric before and after a metric change message. This may increase the load of the data processing system. Therefore the alert manager 332 may use a number of strategies to minimize the number of queries performed on the data processing system. The first strategy to be used for reducing the overhead of querying is batching multiple metric change messages into single queries to the data processing system. For example, consider there are 1000 incoming metric change messages per second. Instead of sending 1000 separate queries to the data processing system, this may be collapsed into a single batch request to the data processing system with a filter on the metric ids. The filter on the metric ids filters out only those metric ids who are related to an alert. The batch requests are done to prevent that queries are done at a higher rate than the expected rate of the changes. It is an advantage of embodiments of the present invention that batching of the requests saves a significant amount of resources in the data processing system, as each individual request (either for a single entity or batch) needs to evaluate how to fulfil the query and create read requests for the necessary data. When batching metric requests by a number of for example around 1000, the pre-evaluation only needs to be performed once per 1000 entities. Additionally, on the off chance that multiple metric change messages come in for the same metric within the same second, this allows a major de-duplication of effort.

In embodiments of the present invention the alert state of a metric may be cached. A metric may for example have had the alert on sumAmountLast7Days activated. This fact may be cached in memory in the alert manager 332. It is an advantage that any further incoming metric change messages can thereafter be ignored unless they include the hint that the sumAmountLast7Days has (potentially) decreased.

If multiple metrics are used for an alert condition, further optimizations can be employed by caching the last-read value that caused the Boolean predicate to fail. For example, consider an alert defined as "sumAmountLast7Days>100 and contractCount>10". When evaluating this predicate on a metric and in case both portions of the predicate fail, then it is possible to wait until at least one metric change message for sumAmountLast7Days and at least one variable change message for contractCount are received before doing a query this metric again. This method can be applied when the Boolean predicate is decomposable into multiple AND-ed components. In embodiments of the present invention an additional optimization that may be applied in the case of multiple AND-ed components and cached alert state is pushing the alert condition through to the data processing unit as an additional filter. By checking the ids that are returned, it can already be determined if the alert state has changed.

This optimization benefits from the fact that field-based filters are applied in the data processing system before any aggregation primitives are calculated, and filters on aggregation primitives are applied before any formulas are calculated. In this way, the calculation of metric values can be short-circuited within the data processing system.

It is an advantage of embodiments of the present invention that alert conditions that can be decomposed as well as alert conditions that are easily reached have a low impact on the data processing system.

In embodiments of the present invention the metric change queue 321 and the alert notification queue 333 are separate topics on a queue. The metric change queue 321 is partitioned, and metric change messages include the metric id as a key, which causes all messages for a single metric id to be sent to the same consumer. This facilitates the caching and optimizations outlined in the previous section. The alert notification queue 333 is an interface for integrating external systems with the data processing system 100. Due to the filtering and processing of the metric value updates into alert notifications, this queue is much lower traffic and thus allows for easier integration with external systems. Typically standardized queue mechanisms are used for integrating the data processing system 100 with an external system. JMS is a typical example thereof.

Figure 2:
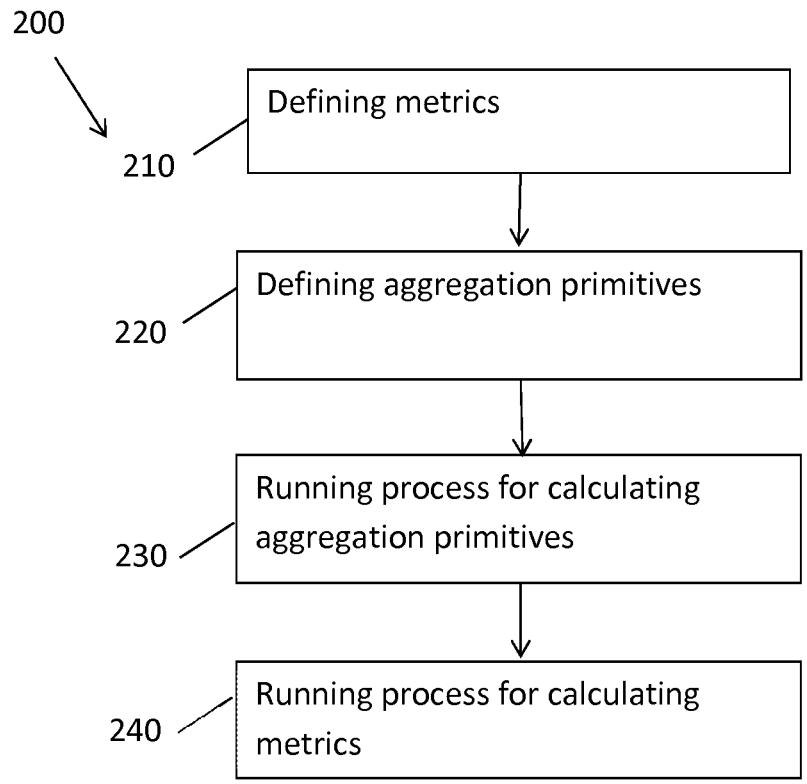
FIG. 2 is a flow chart illustrating the method steps in a method according to an embodiment of the present invention.

In a second aspect the present invention relates to a method 200 for processing data related to incoming interactions. An example thereof is illustrated in FIG. 2.

In a first configuration step 210 metrics are defined for being used for querying the data related to incoming interactions. Depending on the type of information a user wants to extract from the data related to incoming interactions, different metrics will be defined. A plurality of metrics may be defined within a single system.

In a second configuration step 220, aggregation primitives are defined, taking into account a relationship between the aggregation primitives and the defined metrics, and considering a relationship between data related to incoming interactions and aggregation primitives. The aggregation primitives may thereby be configured so as to be calculated from the interaction data using simple, only distributive, operations (e.g. sum, max, min) The operators to obtain the metrics may be more complex as these metrics are ultimately calculated upon request and it is not required that they are calculated on a real-time basis upon arrival of incoming interactions.

A third step 230 comprises running a process wherein the data related to incoming interactions is received and wherein at least one aggregation primitive is calculated in real time based on this data. The process therefore uses the relationship between the incoming interactions and the aggregation primitives defined in the second configuration step 220. The at least one aggregation primitive is stored in a data storage element without storing raw data related to the incoming interactions. The process for calculating and storing the aggregation primitives may be continuously running.

A fourth step 240 comprises running a process wherein requests for the at least one metric are received and wherein the at least one metric is calculated based on the relationship between the at least one aggregation primitive and the at least one metric. The metrics may be calculated upon request. Some metrics may also be calculated upon arrival of a new interaction.

In embodiments of the present invention the process for calculating the aggregation primitives and the process for calculating the metrics are running in parallel.

The invention claimed is:

1. A computer implemented data processing system for processing data related to incoming interactions, the data processing system comprising:
    a first configuration object defining a set of metrics,
    a second configuration object defining a number of aggregation primitives, by analyzing requirements of the set of metrics,
    a first processing unit adapted for receiving data related to incoming interactions, and adapted for real time calculation of at least one aggregation primitive based on this data taking into account the second configuration object,
    a data storage element for storing the calculated at least one aggregation primitive without storing raw data related to the incoming interactions,
    a second processing unit adapted for calculating one or more metrics based on the stored at least one aggregation primitive taking into account the first configuration object and the second configuration object,
    the data processing system moreover comprising a metric change queue and a write interceptor adapted to intercept storing of the at least one aggregation primitive and to evaluate which metrics may be affected by this aggregation primitive and to add these potentially affected metrics to the metric change queue.

2. A computer implemented data processing system according to claim 1, wherein the first processing unit is adapted for requesting data from an external storage medium and wherein the first processing unit is adapted for calculating at least one aggregation primitive based on the data requested from the external storage medium.

3. A computer implemented data processing system according to claim 1, wherein the first configuration object and the second configuration object are one and the same object.

4. A computer implemented data processing system according to claim 1, wherein the first processing unit and the second processing unit are one and the same processing unit.

5. A computer implemented data processing system according to claim 1, wherein the first processing unit is adapted for subdividing interactions into interaction types.

6. A computer implemented data processing system according to claim 1, wherein the first processing unit is adapted for grouping aggregation primitives based on the extracted data.

7. A computer implemented data processing system according to claim 1, wherein the first processing unit and/or the second processing unit is adapted for monitoring at least one metric.

8. A computer implemented data processing system according to claim 7, wherein the first processing unit and/or the second processing unit is configured to generate an alert based on the monitored at least one metric.

9. A method for processing data related to incoming interactions, the method comprising:
    defining a set of metrics in a first configuration object,
    defining a number of aggregation primitives in a second configuration object by analyzing requirements of the set of metrics,
    running a process wherein the data related to incoming interactions is received and wherein at least one aggregation primitive is calculated in real time based on this data taking into account the second configuration object, and wherein the at least one aggregation primitive is stored in a data storage element without storing raw data related to the incoming interactions, and
    running a process wherein requests for the at least one metric are received and wherein the at least one metric is calculated based on the stored at least one aggregation primitive taking into account the first configuration object and the second configuration object, and
    intercepting storing of the at least one aggregation primitive and evaluating which metrics may be affected by this aggregation primitive and adding these potentially affected metrics to a metric change queue.

\* \* \* \* \*